United States Patent [19]

Holman et al.

[11] Patent Number: 4,867,291

[45] Date of Patent: Sep. 19, 1989

[54] VEHICLE TRANSMISSION HILL HOLDER WITH RELEASABLE ONE WAY CLUTCH

[75] Inventors: James L. Holman, Wauseon; George A. Willford; Kurt R. Baer, both of Toledo, all of Ohio

[73] Assignee: Dana Corporation, Toledo, Ohio

[21] Appl. No.: 212,445

[22] Filed: Jun. 28, 1988

[51] Int. Cl.⁴ ............................................. B60K 41/26
[52] U.S. Cl. ..................................... 192/4 A; 192/7; 74/335; 74/336 R
[58] Field of Search ...................... 192/4 A, 7; 74/335, 74/336 R

[56] References Cited

U.S. PATENT DOCUMENTS

| | | | |
|---|---|---|---|
| 2,003,963 | 6/1935 | Banker | 192/4 A |
| 2,038,985 | 4/1936 | Browne | 192/4 A |
| 2,049,798 | 8/1936 | Booth et al. | 192/4 A |
| 2,609,901 | 9/1952 | Rauen | 192/4 A |
| 2,981,388 | 4/1961 | Peras | 192/4 A |
| 4,650,046 | 3/1987 | Parsons | 192/4 A |

FOREIGN PATENT DOCUMENTS 54-102723  8/1979  Japan .................................. 192/4 A Primary Examiner—Leslie A. Braun
Assistant Examiner—David A. Testardi
Attorney, Agent, or Firm—MacMillan, Sobanski & Todd

[57] ABSTRACT

A hill holder device for a vehicle manual transmission includes a releasable one-way clutch which is coupled to the countershaft of the transmission. In particular, the one-way clutch includes a sprag clutch having an inner race secured to the countershaft, and an outer race secured to the vehicle transmission case by means of a releasable locking mechanism. When the locking mechanism is in its locked position, the sprag clutch enables rotation of the countershaft in only one direction. Thus, if the transmission is in a forward gear and comes to a stop on an ascending grade, the hill holder will lock the vehicle drive train and prevent the vehicle from rolling back down the grade, without requiring the driver to apply the brakes. Similarly, if the vehicle is in a reverse gear and is stopped on a descending grade, the hill holder will prevent the vehicle from rolling in a forward direction down the grade. If necessary, the locking mechanism can be unlocked to release the hill holder in order to facilitate shifting in the event torque lock of the vehicle drive train locks the gear shifting components after the hill holder has become engaged on an inclined surface.

20 Claims, 2 Drawing Sheets

VEHICLE TRANSMISSION HILL HOLDER WITH RELEASABLE ONE WAY CLUTCH

BACKGROUND OF THE INVENTION

The present invention relates to a vehicle transmission which includes a hill holder device and, in particular, to a hill holder device which includes a unidirectional or one-way clutch.

Various types of hill holder devices have been proposed to prevent a vehicle from rolling backward down an incline after the vehicle has come to a stop and the driver releases the brake pedal. Such hill holder devices are especially desirable on vehicles equipped with a manual transmission which is shifted by means of a foot operated clutch pedal. When a vehicle having a manual transmission is stopped on an incline, the driver will normally position one foot on the clutch pedal to disengage the transmission and the other foot on the brake pedal to hold vehicle stationary on the incline. When it is time to continue up the incline, the foot on the brake pedal must be moved to the accelerator to increase the engine speed at the same time the clutch pedal is returned to its rest position. This procedure is awkward at times because the vehicle immediately moves backward once the foot on the brake pedal is separated therefrom to release the brake system. It is in these instances wherein a hill holder device is especially desirable, since it prevents roll back of the vehicle after the brake pedal has been released.

One type of hill holder device, such as the device disclosed in U.S. Pat. No. 4,582,184, is activated when the clutch pedal is depressed as the vehicle comes to a stop on an incline with the vehicle brakes applied. The hill holder device is operative to maintain the brake pressure to the vehicle brakes after the brake pedal has been released. Brake pressure is maintained until the operator begins to release the clutch pedal.

Another type of hill holder device is disclosed in U.S. Pat. No. 4,650,046. The hill holder of this patent includes a unidirectional clutch coupled to a vehicle driveshaft. The unidirectional clutch is a sprag clutch having an inner race secured for rotation with the driveshaft, and an outer race selectively coupled to the vehicle transmission case by means of a multi-plate clutch unit. When the multi-plate clutch is fully engaged, the sprag clutch permits rotation of the vehicle driveshaft in only one direction. The multi-plate clutch is provided to control the rate of engagement of the hill holder device so as to prevent undue shocks or stress occurring in the transmission in the event the hill holder is engaged after the vehicle has begun to move backwards.

SUMMARY OF THE INVENTION

The present invention relates to a unique hill holder mechanism for a vehicle transmission. In the preferred embodiment of the invention, the hill holder mechanism is utilized in an automated mechanical transmission, i.e., a conventional manual transmission having control mechanisms for automatically actuating the clutch and shifting the gears in accordance with predetermined operating conditions. The hill holder mechanism of the present invention includes a releasable one-way clutch means which is coupled to the output shaft of the transmission so as to permit rotation of the output shaft in only one direction whenever the transmission is in a forward gear position and in only an opposite direction whenever the transmission is in a reverse gear position. A control means is provided for selectively releasing the clutch means to enable rotation of the output shaft in either direction.

Preferably, the clutch means is a sprag clutch which is located in the bell housing of the transmission, and is coupled to a forward end of a transmission countershaft. In particular, the sprag clutch of the preferred embodiment has an outer race secured to the countershaft for rotation therewith, and an inner race which is coupled to the vehicle transmission case by releasable locking means. The locking means is movable between a locked position wherein the outer race is prevented from rotating relative to the countershaft and an unlocked position wherein the outer race can rotate in either direction relative to the countershaft. When the locking means is in the locked position, the transmission countershaft can only rotate in a single direction.

It has been found that the hill holder of the present invention, while being desirable for use with a vehicle manual transmission, is especially advantageous in an automated mechanical transmission. By preventing roll back of the vehicle on an incline, the automatic control of the clutch engagement when starting the vehicle is greatly facilitated.

The automated mechanical transmission with which the hill holder of the present invention is used includes a driver-operated gear shift lever which is electrically coupled to operate a gear shifting mechanism. In one embodiment of the invention, the control means is operable to automatically release the locking means when the shift lever is shifted to a neutral position. In an alternate embodiment, the control means is operable to automatically release the locking means when the gear shift mechanism has not shifted the transmission to a neutral position within a predetermined time period after the shift lever is shifted to a neutral position. Also, a driver actuated manual switch can be provided to allow the driver to selectively release the clutch means.

Other features and advantages of the present invention will become readily apparent to one skilled in the art from reading the following detailed description in conjunction with the attached drawings.

DESCRIPTION OF THE PREFERRED EMBODIMENT

Figure 1:
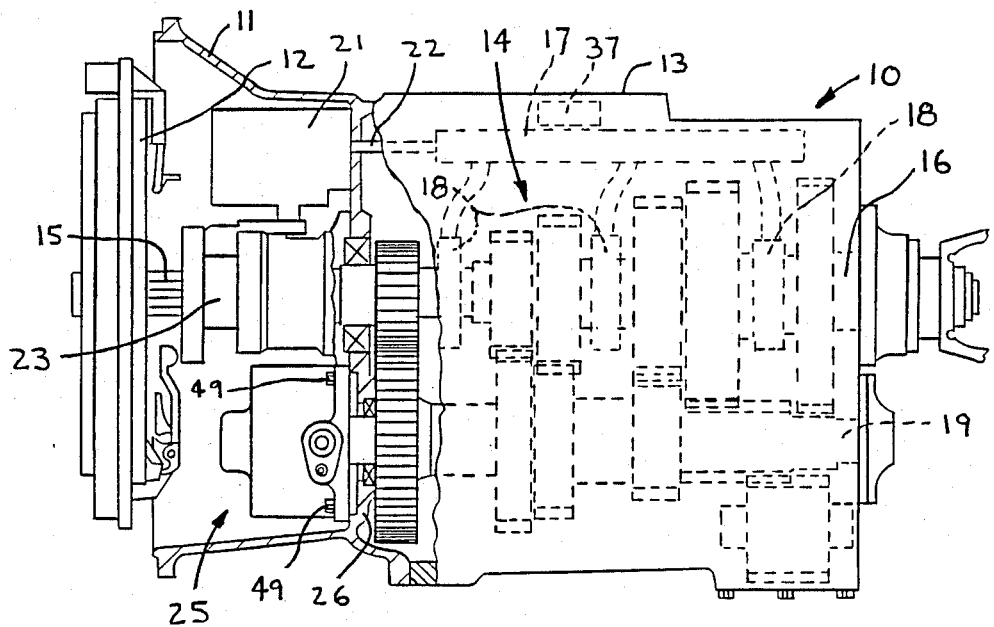
FIG. 1 a side elevational view, partly in section, of a transmission which incorporates a hill holder device of the present invention.

Referring to FIG. 1, there is shown a side view of a transmission 10 which can utilize the hill holder of the present invention. The transmission 10 includes a front bell housing 11 containing a clutch assembly 12, and attached to a rear main case 13 containing the transmission gearing (generally represented by the reference numeral 14) and associated shifting components. The clutch assembly 12 is coupled to a transmission input shaft 15 which in turn is coupled to a coaxial transmission output shaft 16 through the gearing 14. The transmission gearing 14 is shifted by means of a plurality of axially moveable shift rails 17 (only one of which can be seen in FIG. 1), each of which is connected to a separate shifting collar 18. Except when the transmission is in a direct drive gear, or in neutral, power is transmitted between the input shaft 15 and the output shaft 16 through a countershaft 19 spaced from and parallel with the shafts 15 and 16. In direct drive gear, the input shaft 15 and output shaft 16 are directly coupled to one another.

The transmission illustrated in FIG. 1 is an automated mechanical transmission, i.e., a conventional manual transmission having control mechanisms for automatically actuating the clutch and shifting the gears. As shown in FIG. 1, a gear shift actuating mechanism 21 is located in the upper portion of the bell housing, and is connected to the shift rails 17 by actuating rods 22 which extend through the rear wall of the bell housing. The clutch assembly 12 is operated by an actuating cylinder 23. The gear shift actuating mechanism 21 and the clutch actuating cylinder 23 are automatically operated by an electronic control 36 (not shown in FIG. 1), which monitors various operating parameters such as vehicle speed, engine speed, current gear position, etc., and controls the shifting of the transmission in accordance with predetermined operating parameters.

In the preferred embodiment, the hill holder of the present invention is located in the lower portion of the bell housing 11, and is generally illustrated in FIG. 1 by the reference number 25. As will be discussed in detail, the hill holder incorporates a releasable one way clutch which is mounted on the forward end of the countershaft 19 which extends through a rear wall 26 of the bell housing 11, which is actually the front wall of the main case 13. Normally, when the transmission is in a forward gear and is moving in a forward direction, or is in a reverse gear and is moving in a reverse direction, the countershaft 19 will rotate in the same direction. The one way clutch of the hill holder 25 enables free rotation of the countershaft in this direction. However, when the transmission is in either a forward or reverse gear and the vehicle is stopped, the hill holder will resist rotation of the countershaft in an opposite direction. Thus, if the vehicle is in a forward gear and comes to a stop on an ascending grade, the hill holder will lock the vehicle drive train and prevent the vehicle from rolling back down the grade, without requiring the driver to apply the brakes. Similarly, if the vehicle is in a reverse gear and is stopped on a descending grade, the hill holder will prevent the vehicle from rolling in a forward direction down the grade.

Figure 2:
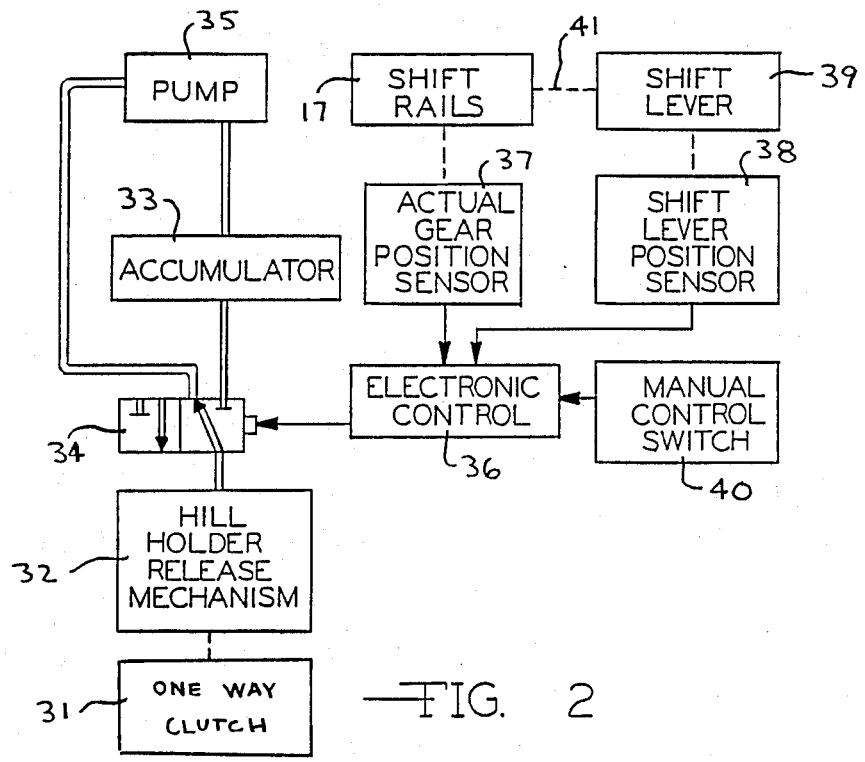
FIG. 2 is a block diagram illustrating the control system utilized to operate the hill holder mechanism of the present invention.

Referring now to FIG. 2, there is shown a block diagram of a control system associated with the hill holder 25. The hill holder 25 includes a one way clutch 31 coupled to a hill holder release mechanism 32. The specific construction of the clutch 31 and the release mechanism 32 will be discussed in detail hereinafter with reference to FIG. 3. Preferably, the release mechanism 32 is hydraulically operated. As shown in FIG. 2, the release mechanism is connected to receive pressurized fluid from an accumulator 33 through a three way solenoid valve 34. The accumulator 33 is charged and maintained at a predetermined pressure by a pump 35. The solenoid valve 34 receives an energization signal from an electronic control 36.

In order to determine whether the hill holder release mechanism is to be actuated, the electronic control is connected to receive signals from an actual gear position sensor 37 and a shift lever position sensor 38. In FIG. 2, the actual gear position sensor 37 (which can be located above the shift rails as shown in FIG. 1) maintains the position of the shift rails 17 to provide a signal to the electronic control when the transmission gearing has actually moved to a neutral position. The shift lever position sensor 38 is coupled to a driver actuated shift lever 39 to provide a signal to the electronic control representing the gear position selected by the driver.

In operation, as long as the shift lever 39 is in either a forward or reverse gear, the solenoid will remain unactuated and the hill holder will be engaged, thus preventing rolling of the vehicle in a direction opposite the selected gear. When actuated, the solenoid supplies pressurized fluid to the release mechanism and thereby releases the one way clutch to allow free rotation of the countershaft in either direction. In the preferred embodiment of the invention, in order to conserve the supply of pressurized fluid in the accumulator and thus reduce the working time of the pump, it is desirable to release the hill holder only in those instances wherein "torque lock" of the drive train prevents the gear shift actuator from executing a shift requested by the driver via the shift lever 39.

If the transmission is in a forward gear and the shift lever 39 is shifted to neutral or a reverse gear, or is in a reverse gear and is shifted to neutral or a forward gear, it is normally not necessary to release the hill holder. However, in some circumstances, such as when the vehicle is located on a relatively steep incline with the one way clutch fully locked to prevent rollback of the vehicle, torque lock of the vehicle drive train may lock the gear shifting components and prevent the gear shifting actuator from effecting the desired shift. In these circumstances, it is desirable to temporarily disengage the hill holder to relieve the torque lock and enable the desired shift to be made. Thus, with the present invention, the electronic control is operative to sense the neutral signal from the sensor 38 as the shift lever moves to or through a neutral position and, in the event a neutral signal is not received from the actual gear position sensor 37 within a predetermined time after receiving the neutral signal from the sensor 38, the electronic control will cause the hill holder to be temporarily disengaged while the desired shift is made.

As an alternative to the above-discussed control operation, the hill holder can be automatically disengaged whenever the electronic control 36 receives a neutral signal from the shift lever position sensor 38. This would eliminate the need for the actual gear position sensor 37 in controlling the hill holder. However, such control would require a supply of pressurized fluid each time the transmission is shifted either to or through neutral, regardless of whether it was actually necessary to disengage the hill holder.

Also shown in FIG. 2 is a manual control switch 40 connected to the electronic control 36, and which is actuated by the vehicle driver in instances wherein the driver wishes to release the hill holder. While the manual control switch 40 is shown for use in conjunction with the sensors 37 and 38, the manual switch 40 is generally not required in instances wherein the shift lever 39 is not mechanically connected to the shift rails 17, as is the case with the above described automated mechanical transmission. However, if the hill holder of the present invention is incorporated in a transmission (such as a conventional, manually shifted transmission) wherein the driver shift lever linkage is directly coupled to the associated shift rails (as represented by the dashed line 41 shown in FIG. 2), it has been found desirable to provide the manual control switch 40. In these instances, when the driver experiences difficulty in shifting the gears due to drive line torque lock, he can actuate the manual switch to release the hill holder. If desired, the manual switch can be a momentary switch, and the electronic control can include means for generating the solenoid energization signal for a predetermined time period after the switch is actuated sufficient to allow the driver to make the desired shift.

Figure 3:
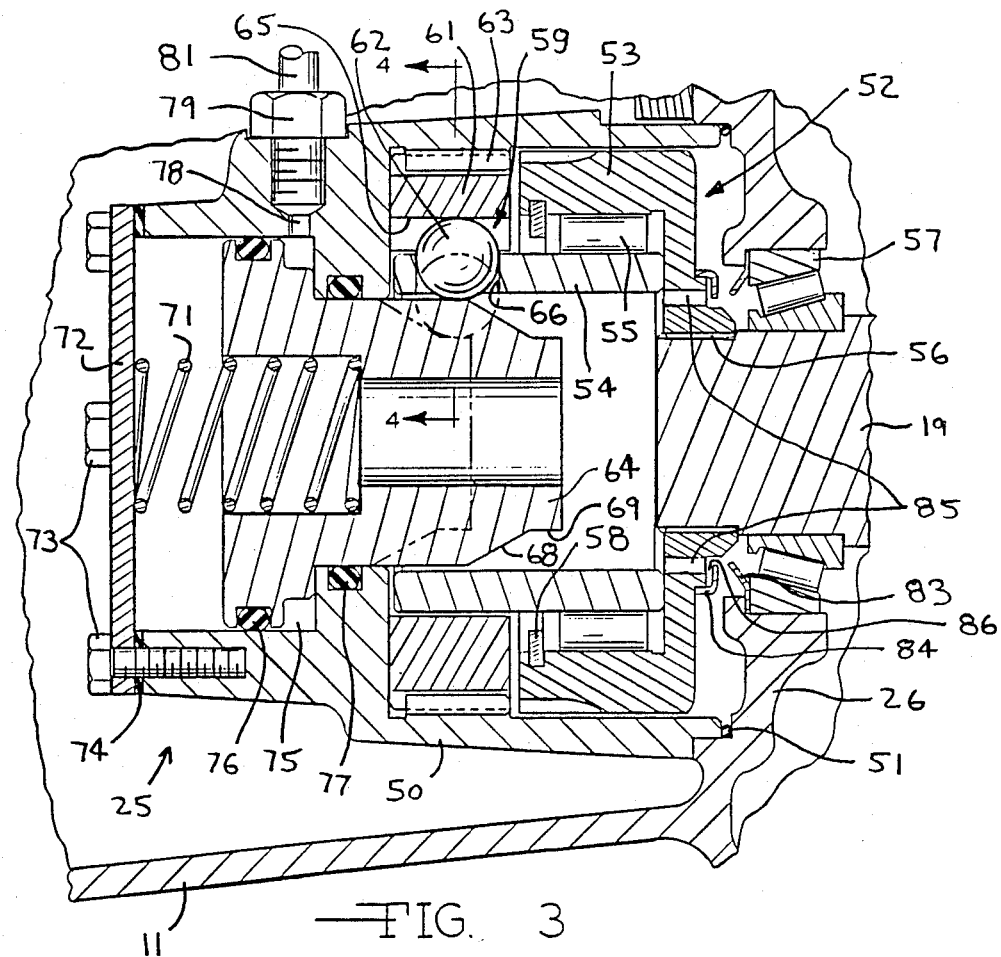
FIG. 3 is a sectional view taken through the hill holder device of FIG. 1.

Referring now to FIG. 3, the specific construction of the hill holder mechanism will now be discussed. The hill holder 25 includes a cylindrical outer housing 50 supported on the rear wall 26 of the bell housing 11 in coaxial relationship with the countershaft 19. The housing 50 can be secured to the rear wall by a plurality of bolts 49 (shown in FIG. 1). An 0-ring 51 is sealingly positioned between the housing 50 and the bell housing wall 26.

The one way clutch used in the preferred embodiment of the invention is shown as a sprag clutch assembly 52 which includes an outer race 53, an inner race 54, and a sprag assembly 55. In accordance with the present invention, the sprag clutch assembly is coupled to the front end of the countershaft 19 which, as previously mentioned, extends through the bell housing wall 26. More specifically, the outer race 53 is provided with internal splines at 56 which mate with cooperating external splines formed on the forward end of the countershaft to prevent relative rotation between outer race 53 and the countershaft. The front end of the countershaft is supported by a tapered roller bearing assembly 57.

The sprag assembly 55 is positioned within the outer race 53, and is held therein by a snap ring 58. The sprag assembly supports the inner race 54 for free rotational movement relative to the outer race 53 in one direction (the normal direction of rotation of the countershaft), but resists relative rotation in the opposite direction.

Normally, the inner race 54, which extends axially from the sprag clutch, is locked relative to the hill holder housing 50 by means of a releasable locking mechanism, generally indicated by reference numeral 59. The locking mechanism 59 includes an outer lock race 61 and a plurality of circumferentially spaced lock balls 62 (only one of which can be seen in FIG. 3). The lock race is provided with external splines at 63 which mate with cooperating internal splines formed in the hill holder housing to prevent rotation of the lock race.

Figure 4:
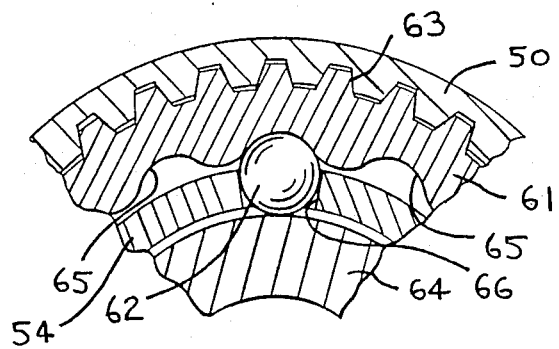
FIG. 4 is a sectional view taken along the line 4-4 of FIG. 3 and illustrating the construction of the releasable locking mechanism which is incorporated in the hill holder of the present invention.

The locking mechanism 59 is controlled by a fluid actuated piston 64 which is axially shiftable within the hill holder housing to control the radial position of the locking balls 62. When the piston 64 is in the solid line position shown in FIG. 3, the balls 62 will be retained in an outer radial position wherein the inner race of the sprag clutch is locked relative to the lock race. In this position, an outer portion of the ball 62 is received within one of a plurality of axially extending, semi-cylindrical recesses 65 (also shown in FIG. 4) provided in the lock race, while the inner portion of the ball 62 is received in a radially extending aperture 66 formed in the inner race 54. The ball is maintained in this position by the piston 64, which includes an outer cylindrical surface 67 which engages the ball 62 and prevents radial inward movement of the ball out of the associated recess.

When it is desired to release the locking mechanism, the piston 64 is shifted axially to the left to the position shown in phantom in FIG. 3. As the piston is shifted, the locking balls 62 can move radially inwardly along an angled surface 68 of the piston 64 until the ball engages a reduced diameter cylindrical surface 69. At this point, the outermost portion of the ball (as shown in phantom in FIG. 3) will be located radially inwardly from the innermost portions of the locking race, thereby permitting free rotation of the inner race 54.

The piston 64 is spring biased by a helical coil spring 71 to maintain the locking mechanism in a normally locked condition. The spring 71 has one end which is received into a cavity formed in the left end of the piston, and an opposite end which engages the inner surface of an end cap 72. The end cap 72 is secured to the left end of the hill holder housing by a plurality of bolts 73. A gasket 74 is positioned between the end cap 72 and the end face of the hill holder housing 50 to seal the interior thereof.

The piston 64 is axially shifted toward the left to release the locking mechanism by means of pressurized hydraulic fluid. The piston 64 and the hill holder housing 50 cooperate to define an annular chamber 75 therebetween, which is sealed by means of 0-rings 76 and 77. Hydraulic fluid can be introduced into the chamber through an aperture 78 formed in the sidewall of the housing 50. A fitting 79 having a hydraulic line 81 connected thereto is threaded into the aperture 78. The line 81 receives pressurized hydraulic fluid from the accumulator 33 through the solenoid valve 34 (shown in FIG. 2). It will be appreciated that, as the pressure of the fluid in the chamber 75 increases sufficiently, the axial force exerted by the spring 71 will be opposed and overcome by the hydraulically exerted force, causing the piston 64 to be shifted to the left, and thereby releasing the locking mechanism. When the hydraulic pressure is relieved, the spring 71 will urge the piston 64 back to the right, thus forcing the lock balls 62 into the adjacent recesses 65, and locking the locking mechanism.

The hill holder includes a unique means of providing lubricating oil to the sprag assembly. In particular, an annular baffle 83 is located adjacent the tapered roller bearing assembly 57, while the outer race of the sprag clutch carries an oil ring 84. A plurality of circumferentially positioned passageways 85 are located adjacent the oil ring 84 and extend through the side wall of the outer race 53. In operation, oil passing through the bearing will be directed by the baffle 83 into an area 86 located between the oil ring and the outer race. From this point, oil will flow through the passageways 85 and into the sprag clutch.

The present invention has been illustrated and described in its preferred embodiment. However, while the preferred embodiment of the hill holder of the present invention is disclosed for use in conjunction with an automated mechanical transmission, it will be appreciated that the hill holder can also be incorporated in a conventional manual transmission wherein the transmission is shifted by means of a shift lever assembly operated by the vehicle driver in conjunction with a foot operated clutch pedal. In this case, as discussed above with reference to FIG. 2, it is desirable to provide the manual control switch to enable the driver to selectively release the hill holder in the event drive line torque lock inhibits shifting of the transmission.

Also, while the preferred embodiment discloses a specific locking mechanism which is released by a hydraulically operated actuator, it will be appreciated that other types of locking mechanisms and/or actuating mechanisms can be used. For example, a multi-plate clutch as disclosed in above discussed U.S. Pat. No. 4,650,046, which is herein incorporated by reference, could be used to couple one of the races of the sprag clutch to the hill holder housing. Thus, modifications can be made to the disclosed embodiment of the invention without departing from the scope of the attached claims.

What is claimed is:

1. A hill holder mechanism for a vehicle transmission having an input shaft coupled to the vehicle engine and an output shaft coupled to the vehicle drive wheels, the transmission including a countershaft spaced from and coupled to said input and output shafts by a gear train, the transmission further including shifting means for shifting the transmission between a forward gear position, a neutral position, and a reverse gear position, said hill holder mechanism comprising:

releasable one-way clutch means coupled to said output shaft of said transmission for permitting rotation of said output shaft in only one direction whenever said transmission is in said forward gear position and in only an opposite direction whenever said transmission is in said reverse gear position;

control means for selectively releasing said clutch means to enable rotation of said output shaft in either direction;

said clutch means including a one-way sprag clutch wherein said sprag clutch includes an inner race and an outer race, one of said inner and outer races coupled to a releasable locking means and the other one of said inner and outer races secured to said countershaft for rotation therewith; and said locking means moveable between a locked position wherein rotation of said other race is resisted relative to a rotational axis of said countershaft and an unlocked position wherein said other race can freely rotate in either direction relative to said countershaft axis, said locking means including a shiftable piston which is normally spring biased to said locked position, and is hydraulically shiftable to said unlocked position, said piston coupled to at least one locking element which resists rotation of said other race about said countershaft axis when said piston is in said locked position.

2. The hill holder mechanism according to claim 1 wherein said transmission includes a main housing for rotatably supporting said input, output, and countershafts, said transmission further including a bell housing secured to a forward end of said main housing, and wherein said clutch means is located within said bell housing and is coupled to a forward end of said countershaft.

3. The hill holder mechanism according to claim 2 wherein said forward end of said countershaft extends into said bell housing.

4. The hill holder mechanism according to claim 2 including means for directing lubricating oil from said main housing into said sprag clutch.

5. The hill holder mechanism according to claim 1 wherein the transmission shifting means includes a driver-operated shift lever coupled to operate a gear shift mechanism connected to shift the transmission, and said control means is operable to selectively release said clutch means.

6. The hill holder mechanism according to claim 5 wherein said control means is operable to automatically release said control means when said shaft lever is shifted to a neutral position.

7. The hill holder mechanism according to claim 6 wherein said shift lever is electrically coupled to said gear shift mechanism.

8. The hill holder mechanism according to claim 5 wherein said control means is operable to automatically release said clutch means when said gear shift mechanism has not shifted said transmission to a neutral position within a predetermined time period after said shift lever is shifted to a neutral position.

9. The hill holder mechanism according to claim 8 wherein said shift lever is electrically coupled to said gear shift mechanism.

10. The hill holder mechanism according to claim 5 wherein said shift lever is mechanically connected to said gear shift mechanism.

11. The hill holder according to claim 10 wherein said control means includes a driver actuated manual switch for selectively releasing said clutch means.

12. A vehicle transmission having a hill holder mechanism, said transmission including a main housing for rotatably supporting an input shaft coupled to the vehicle engine, an output shaft coupled to the vehicle drive wheels, a countershaft spaced from said output shaft, and a gear train interconnecting said input, output, and countershafts, said countershaft having a front end extending through a front wall of said main housing, said transmission being shiftable between a forward gear position, a neutral position, and a reverse gear position, said hill holder mechanism comprising:

a hill holder housing secured relative to said front wall of said main housing;

a releasable one-way sprag clutch having an inner and outer race, one of said inner and outer races secured to the front end of said countershaft for rotation therewith, and the other one of said inner and outer races coupled to said hill holder housing by locking means;

said locking means moveable between a locked position wherein said other race is prevented from rotating relative to said hill holder housing whereby said sprag clutch permits rotation of said countershaft in only one direction, and an unlocked position wherein said other race can rotate in either direction with said countershaft, said locking means including a shiftable piston which is normally spring biased to said locked position, and is hydraulically shiftable to said unlocked position, said piston coupled to at least one locking element which resists rotation of said other race relative to said hill holder housing when said piston is in said locked position; and control means for selectively moving said locking means between said locked and unlocked position.

13. The hill holder mechanism according to claim 12 wherein the transmission shifting means includes a driver-operated shaft lever coupled to operate a gear shift mechanism connected to shift the transmission, and said control means is operable to selectively release said sprag clutch.

14. The hill holder mechanism according to claim 13 wherein said control means is operable to automatically release said sprag clutch when said shift lever is shifted to a neutral position.

15. The hill holder mechanism according to claim 13 wherein said control means, is operable to automatically release said sprag clutch when said gear shift mechanism has not shifted said transmission to a neutral position within a predetermined time period after said shift lever is shifted to a neutral position.

16. A hill holder mechanism for a vehicle transmission having an input shaft coupled to the vehicle engine and an output shaft coupled to the vehicle drive wheels, the transmission including shifting means having a driver-operated shift lever coupled to operate a gear shift mechanism for shifting the transmission between a forward gear position, a neutral position, and a reverse gear position, said hill holder mechanism comprising:

clutch means coupled to said output shaft of said transmission and normally engaged when the vehicle is stopped to permit rotation of said output shaft in only one direction when said transmission is in said forward gear position and in only an opposite direction when said transmission is in said reverse gear position; and control means for selectively releasing said clutch means to enable rotation of said output shaft in either direction, said control means operable to automatically release said clutch means when said gear shift mechanism has not shifted said transmission to a neutral position within a predetermined time period after said shift lever is shifted to a neutral position.

17. The hill holder mechanism according to claim 16 wherein said shift lever is electrically coupled to said gear shift mechanism.

18. The hill holder mechanism according to claim 16 wherein said transmission includes a countershaft spaced from and coupled to said input and output shafts by a gear train, and said clutch means is connected to said countershaft.

19. A vehicle transmission having a hill holder mechanism, said transmission including a main housing for rotatably supporting an input shaft coupled to the vehicle engine, an output shaft coupled to the vehicle drive wheels, a countershaft spaced from said output shaft, and a gear train interconnecting said input, output, and countershafts, said countershaft having a front end extending through a front wall of said main housing, said transmission including shifting means having a driver-operated shift lever coupled to operate a gear shift mechanism connected to shift said transmission between a forward gear position, a neutral position, and a reverse gear position, said hill holder mechanism comprising:

a hill holder housing secured relative to said front wall of said main housing;

a clutch means having first and second relatively rotatable members, said first member secured to the front end of said countershaft for rotation therewith, and said second member coupled to said hill holder housing by a locking means;

said locking means moveable between a locked position wherein said clutch means is normally engaged when the vehicle is stopped to permit rotation of said countershaft in only one direction when said transmission is in said forward and reverse gear positions, and an unlocked position wherein said countershaft can rotate freely in either direction; and control means for selectively releasing said clutch means to enable rotation of said countershaft in either direction, said control means being operable to automatically unlock said locking means to release said clutch means when said gear shift mechanism has not shifted said transmission to a neutral position within a predetermined time period after said shift lever is shifted to a neutral position.

20. The hill holder mechanism according to claim 19 wherein said shift lever is electrically coupled to said gear shift mechanism.

* * * * *

UNITED STATES PATENT AND TRADEMARK OFFICE
CERTIFICATE OF CORRECTION

PATENT NO. : 4,867,291

DATED : September 19, 1989

INVENTOR(S) : James L. Holman, George A. Willford & Kurt R. Baer

It is certified that error appears in the above-identified patent and that said Letters Patent is hereby corrected as shown below:

Claim 6, line 7, delete "control" and insert -- clutch --.

Claim 15, line 6, after "control means" delete the
-- , --.

Signed and Sealed this

Fourteenth Day of August, 1990

Attest:

HARRY F. MANBECK, JR.

*Attesting Officer*  *Commissioner of Patents and Trademarks*